Dec. 27, 1955   W. R. POSTLEWAITE ET AL   2,728,466
CONVEYOR CONTROL SYSTEM
Filed April 4, 1950   9 Sheets-Sheet 1

INVENTORS
William R. Postlewaite
Herbert Rogers Jr.
Richard H. Long

BY: *Walter G. Miller*
*Ralph L. Freeland Jr.*
ATTORNEYS

Dec. 27, 1955

W. R. POSTLEWAITE ET AL 2,728,466

CONVEYOR CONTROL SYSTEM

Filed April 4, 1950

INVENTORS
William R. Postlewaite
Herbert Rogers Jr.
Richard H. Long

BY: *Walter G. Miller*

*Ralph L. Freeland Jr.*
ATTORNEYS

INVENTORS
William R. Postlewaite
Herbert Rogers Jr.
Richard H. Long

BY: *Walter G. Miller*
*Ralph L. Freeland Jr.*
ATTORNEYS

Dec. 27, 1955  W. R. POSTLEWAITE ET AL  2,728,466
CONVEYOR CONTROL SYSTEM
Filed April 4, 1950  9 Sheets-Sheet 4

INVENTORS
William R. Postlewaite
Herbert Rogers Jr.
Richard H. Long

BY: *Walter G. Miller*
*Ralph L. Freeland Jr.*
ATTORNEYS

INVENTORS
William R. Postlewaite
Herbert Rogers Jr.
Richard H. Long

BY: Walter G. Miller
Ralph L. Freeland Jr.
ATTORNEYS

INVENTORS
William R. Postlewaite
Herbert Rogers Jr.
Richard H. Long

Dec. 27, 1955    W. R. POSTLEWAITE ET AL    2,728,466
CONVEYOR CONTROL SYSTEM
Filed April 4, 1950    9 Sheets-Sheet 8

INVENTORS
William R. Postlewaite
Herbert Rogers Jr.
Richard H. Long
BY: Walter G. Miller
Ralph L. Freeland Jr.
ATTORNEYS

United States Patent Office 2,728,466
Patented Dec. 27, 1955

2,728,466

CONVEYOR CONTROL SYSTEM

William R. Postlewaite, Menlo Park, and Herbert Rogers, Jr., Palo Alto, Calif., and Richard H. Long, Rogue River, Oreg., assignors, by mesne assignments, to California Research Corporation, San Francisco, Calif., a corporation of Delaware Application April 4, 1950, Serial No. 153,848

8 Claims. (Cl. 214—11)

The present invention relates to a conveyor control system, and more particularly, to a control system for a conveyor system adapted to receive packages, or articles, in random groupings capable of segregating such articles into any desired grouping, or shipment of articles and automatically tracing the movement of the articles through the conveyor system.

While conveyor systems, of the type mentioned above, wherein packages are segregated along the length of a main, or header, conveyor, and subsequently routed over a plurality of laterals, have long been known and utilized, the control systems provided for such a conveyor arrangement have generally required the services of several operators to control the dispatching, or segregation, of articles randomly received on the main conveyor, as well as subsequent operators to handle the movement of the articles to the shipping dock, or station. In the separation of articles into one, or two classifications such as in the gauging of sheet steel for over and under-size, it has been possible to accomplish this type of segregation relatively automatically, however, when the separation is into a greater plurality of destinations, such as in the handling of barrels or drums of fuels and lubricants, in numerous sizes and quality as well as for varying destinations of the finished product, the complexity of a control system in accordance with the arrangement provided for simple separations into one or two categories has proved to be impractical. One of the principal difficulties in this regard is the complexity of keeping accurate and current statuses of a particular order or grouping of articles so that the operator can be continuously apprised of the condition of a grouping or order at all stages during the assembly and dispatching of such orders. Because of these deficiencies in the previously known conveying systems, it has been found impracticable to provide automatic conveying systems capable of properly handling and segregating a plurality of randomly received articles so that they may be separated into desired groupings and simultaneously accounted for under the control of a single operator.

Accordingly it is an object of the present invention to provide a control system for a conveyor apparatus which is under the control of a single operator who will be continuously apprised of the status of a particular segregation or grouping subsequent to the dispatching of said articles by the operator.

It is a further object of the present invention to provide a control system for a conveyor in which automatic registration of the total number of articles is accomplished automatically when articles are dispatched.

A still further object of the invention is to provide a tallying system for a conveyor for the automatic tallying of articles dispatched from a main conveyor system to a plurality of laterals wherein the packages or articles are progressively accumulated and stored temporarily and a further automatic tallying system for registering the number of articles removed from the lateral and sent to the shipping, or storage, facilities connected with the conveyor system.

In its broadest form the present invention contemplates a remote control operating system for a conveyor apparatus in which a main conveyor is arranged to distribute packages to a plurality of laterals where the segregated packages are temporarily stored and assembled as a group for storage or shipment, and then subsequently removed from the laterals. More particularly this remote control system contemplates a dispatching station capable of setting up a predetermined pair of totals on a totalizing device corresponding to the number of packages or articles to be routed over a preselected lateral, switch means for operating a time-delay device synchronized with the movement of the packages from the dispatching station to a position adjacent the entrance end of the preselected lateral and simultaneously subtracting a unit from one of said totals, and further switch means operable by the passage of packages from said lateral to the storage or shipping facility for subtracting a unit from the other of said pair of totals.

Further objects and advantages of the present invention will become apparent from the following description taken in conjunction with the accompanying drawings which form an integral part of this specification.

In the drawings:

Fig. 1 is a diagrammatic representation of a conveyor system of the type to which the present invention relates as applied to the dispatching of barrels, or drums, such as those used in the packaging of petroleum products.

Fig. 2 is an enlarged, perspective view of the left-hand portion of Fig. 1 showing in greater detail the arrangement of the incoming supply conveyor for introducing packages to the main, or header, conveyor as well as the return section of the recirculation conveyor, and the dispatching station (broken away to show the interior thereof) which selectively controls the movement of the drums to the associated laterals.

Figure 1:
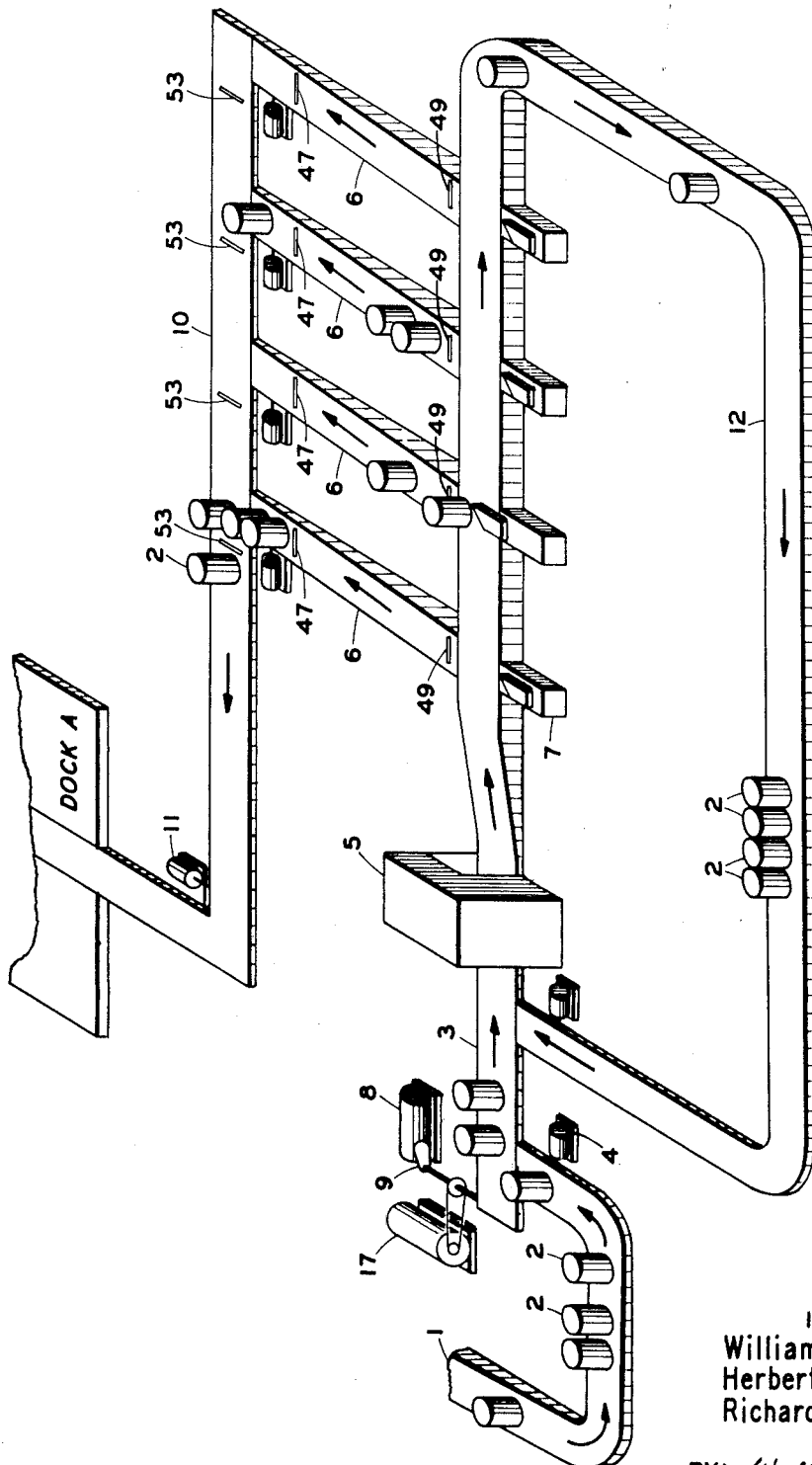

Referring now to the drawings and in particular to Fig. 1, there is shown a conveyor system of the type contemplated in the present invention, wherein a supply conveyor system, or section 1, is arranged to introduce package, for example a plurality of barrels 2 in random assortment as to destination, type of contents, and origin which are arranged to be introduced into a main, or header, conveyor, designated generally as 3. Since it is desirable to admit the barrels 2 onto the header conveyor 3 at fixed intervals, an escapement operating mechanism 4 is provided at the end of supply conveyor 1. The packages 2 are then permitted to flow along the main conveyor 3, through a dispatching station, designated generally as 5, wherein the segregating mechanism for shunting the packages onto the associated laterals 6 is initiated. Each of the laterals 6 is provided with a power-operated deflector mechanism, designated generally as 7, which is adapted to be operated in timed relationship to the arrival of a package adjacent the upper end of the lateral through a time delay device 8 located adjacent the entry end of the main conveyor and driven through apropriate reduction gearing 9 by the driving mechanism of the main conveyor 3, so that time delay device 8 is operated synchronously with the main conveyor. As shown in diagrammatic form, each of the laterals 6 is arranged to serve a foot, or inter-connecting, exit header conveyor 10 which in turn is driven by a suitable drive motor 11. The foot header or delivery conveyor 10 is arranged to serve each of the laterals 6 for transporting the packages or barrels to a station designated as dock A, which may be either a shipping dock or a storage area. As shown in the drawing, the header, or main, conveyor 3 is provided with a recirculation loop designated generally as 12 which is inter-connected with header 3 so that articles which are not dispatched to any of the laterals 6 may be returned to the main conveyor ahead of the dispatching station 5. As will be explained more fully hereinafter, the recirculation loop 12 provides a means for handling articles after a particular lateral is full, or when an article arrives at the dispatching station when there temporarily is no provision for handling that particular type of merchandise on any of the four laterals 6. It will be apparent to those skilled in the art that any number of laterals may be employed and still provide the same flexibility for handling the conveyed articles.

Figure 2:
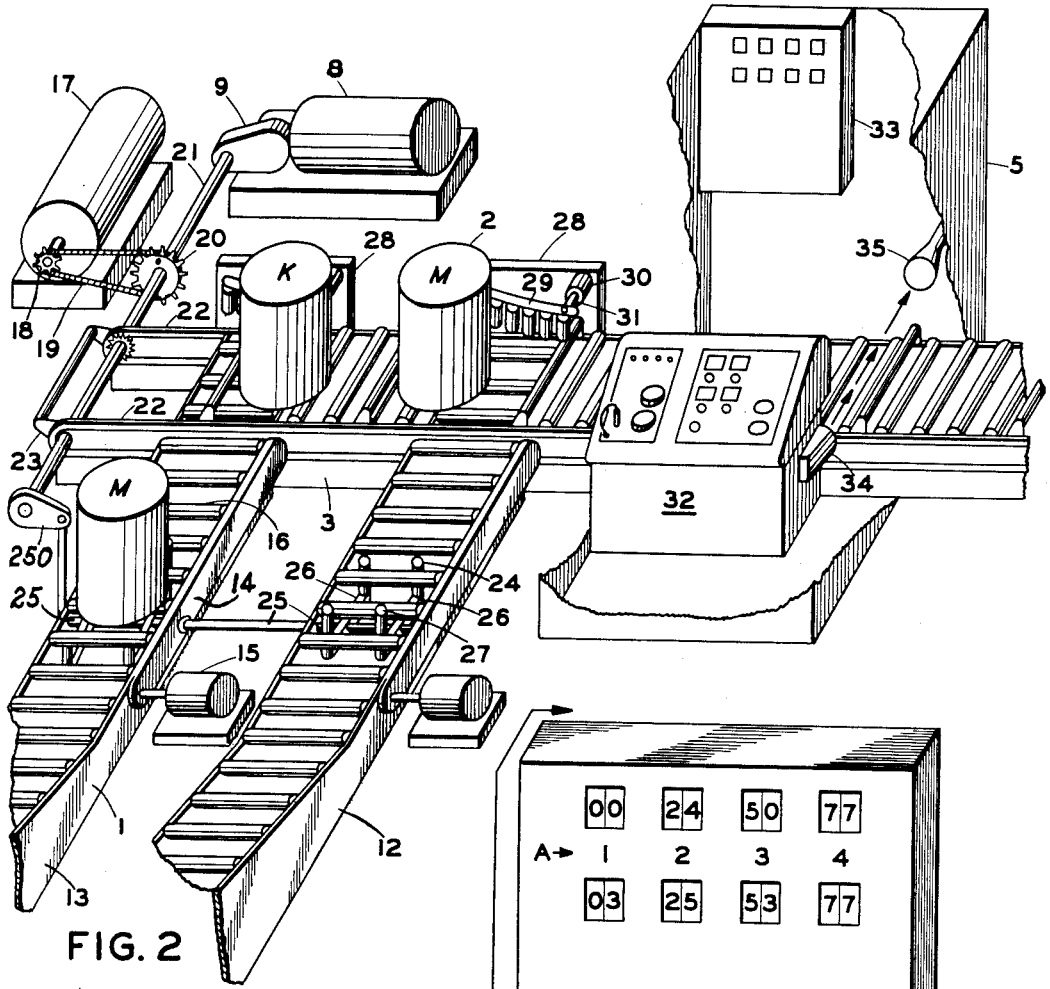
Figure 3:
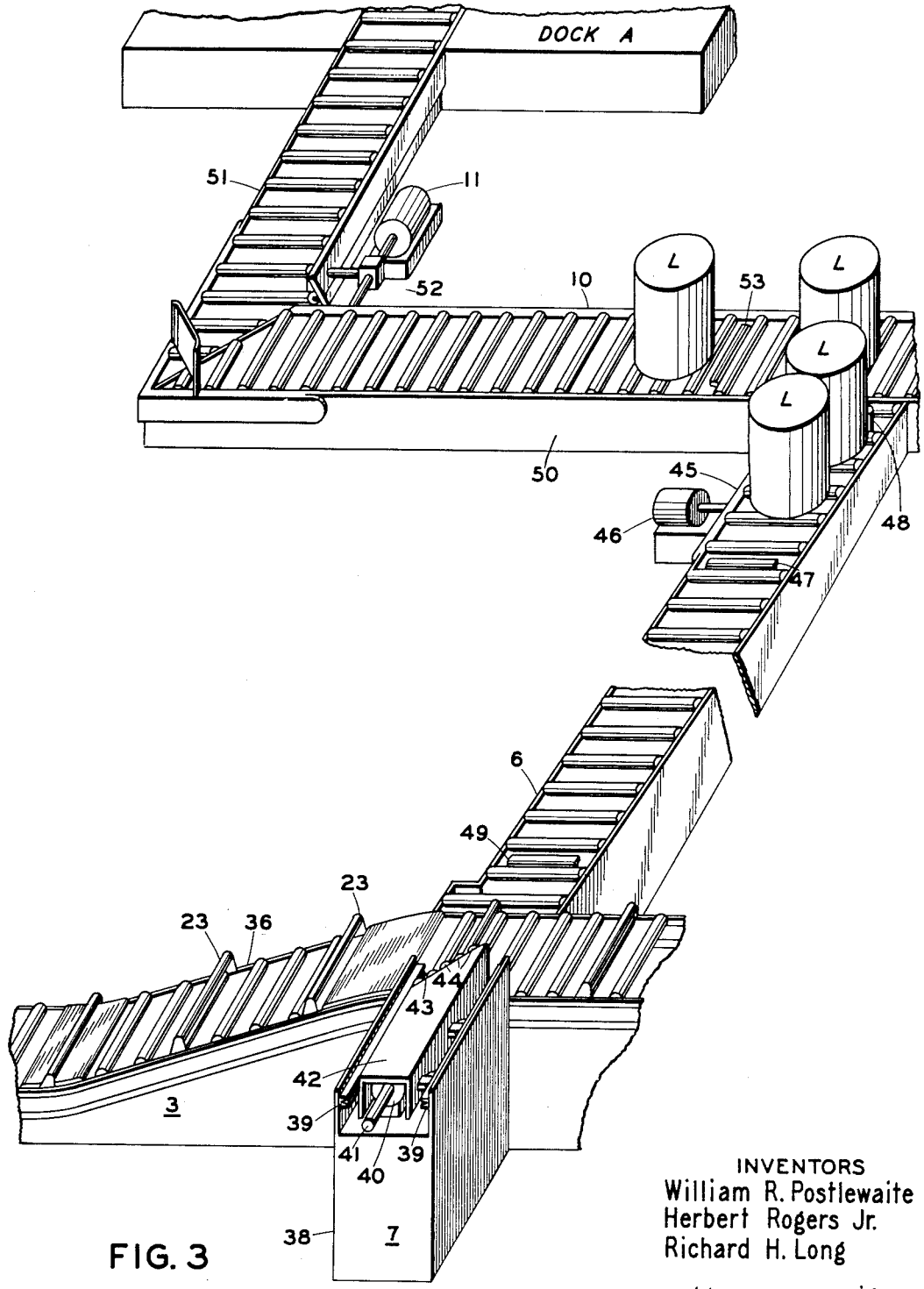
Fig. 3 is an enlarged perspective view of the first lateral adjacent to the dispatching station and the portion of the inter-connecting conveyor between the laterals and the shipping dock, or storage facilities.
Figure 4:
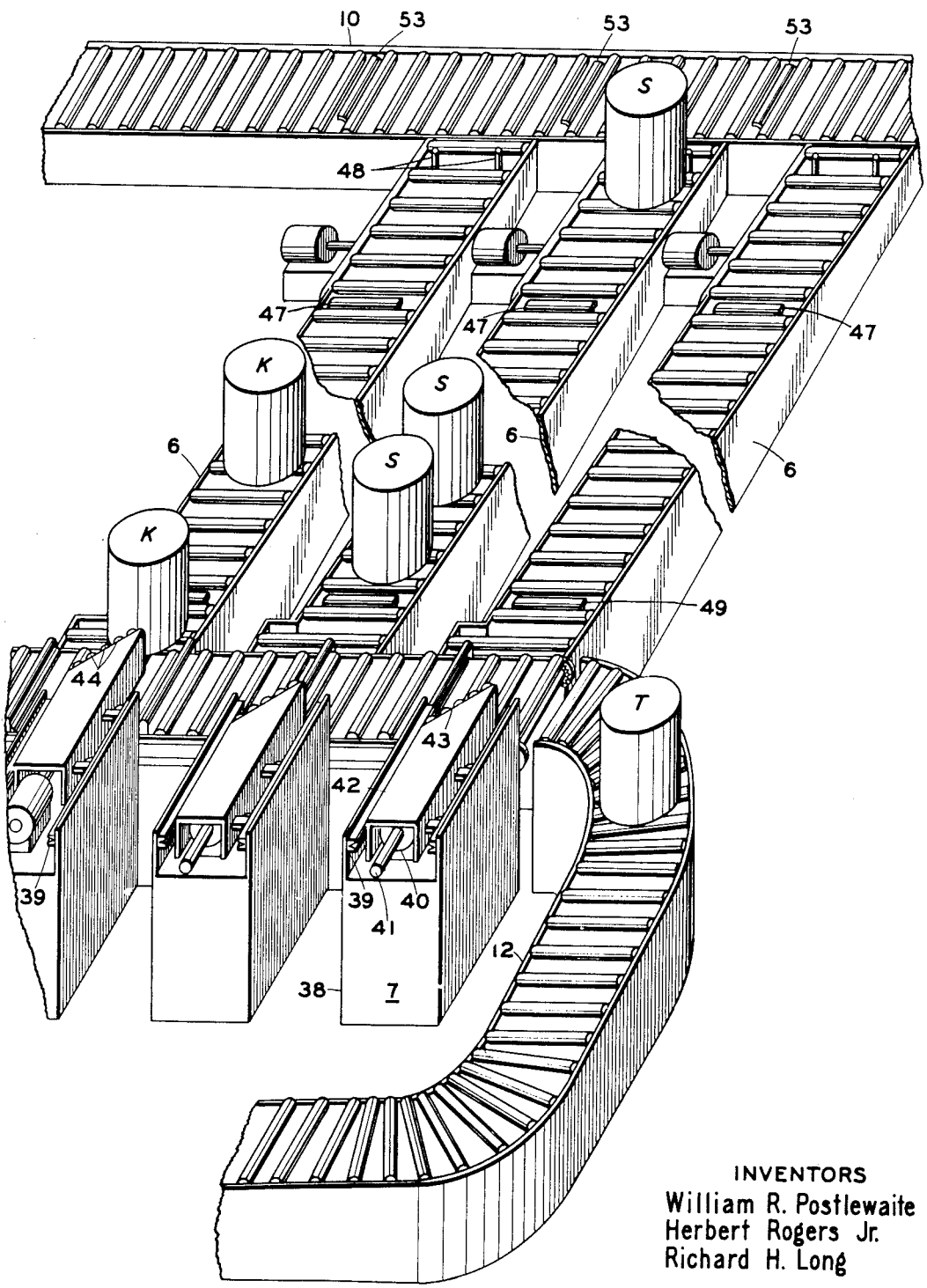
Fig. 4 is an enlarged perspective view of the right-hand portion of the conveyor system shown in Fig. 1 and includes three lateral sections as well as a portion of the recirculation system for packages which have not been segregated to one of the laterals.

In order to more fully disclose the conveyor system shown diagrammatically in Fig. 1, reference is now made to Figs. 2, 3 and 4 which may be arranged in sequence to show the construction details of the conveyor system referred to in Fig. 1. As particularly shown in Fig. 2, barrels, or packages, 2 are arranged to be supplied to the header 3 by means of supply conveyor 1, a portion of which is shown at the left-hand side of Fig. 2. Supply conveyor 1 may be of any conventional type, but as shown in the present embodiment, the barrels 2 may be received on a gravity portion and then introduced to header 3 by a power driven section 14 for the purpose of introducing the barrels to the header conveyor 3 at a predetermined rate. While power conveyor section 14 may be driven by any suitable means, the rollers 16 are preferably driven by means of motor 15 adapted to drive a chain which engages a sprocket arrangement on each of the rollers 16.

As also shown in Fig. 2, recirculation loop 12 is constructed in a manner similar to supply conveyor 1 and may be alternatively operated in place of supply conveyor 1 at the desire of the operator of the dispatching system. While both supply conveyor 1 and recirculation loop 12 could be operated simultaneously they are preferably operated alternatively.

While any positive means for moving the barrels along the main conveyor, or header, 3 would be satisfactory to an application such as that contemplated in the present invention, it has been found that a system of pusher bars mounted upon a chain and arranged to be driven through a sprocket member by a main conveyor drive motor provides a very desirable type of positive movement of the barrels 2. Accordingly, for this purpose, a drive motor 17, having a conventional sprocket member 18 mounted upon the drive shaft for driving a standard chain 19, may be arranged to drive a sprocket wheel 20 mounted on the main drive shaft 21 of the conveyor. This arrangement will provide the desired drive for a pair of chain members 22 on which are mounted a plurality of pusher bars 23 to push the barrels 2 along the main conveyor 3 at a predetermined rate of travel after the barrels are introduced from either the supply conveyor 1 or the recirculation conveyor 12.

In order to supply the barrels to the main conveyor 3 at a predetermined rate such that a barrel will be introduced prior to the arrival of each of the pusher bars 23, an escapement mechanism, designated generally as 24, and best seen in the recirculation conveyor section 12 has been provided, but it will be understood that a similar escapement mechanism 24 is likewise provided on the supply conveyor section 1. For the purpose of synchronizing the operation of escapement mechanism 24 with the movement of the pusher bars 23 on main conveyor 3, escapement device 24 is operated by the main drive motor 17 through any suitable mechanism, such as a crank and pin arrangement 250. While the escapement mechanism 24 may take any suitable form, in the present embodiment, a rocker shaft 25 driven by the crank and pin means 250 is provided with a pair of oppositely directed arms 26, each of which supports a pin, or rod 27, at the opposite ends of arms 26. In this way, when barrels are to be supplied to header 3 at closely spaced intervals, the pins 27 most forward to the header will prevent the entry of a barrel to conveyor 3 when in the up position, but when it is desired to admit the barrel, the forward pins are lowered, while the rearward pins 27 are raised behind the barrel to be admitted to prevent the next barrel from being admitted to the conveyor 3 until after passage of the first barrel past the lowered forward pins and thus onto header 3.

Since the barrels 2 are arranged to be introduced to the main conveyor 3 at a relatively rapid rate from either supply conveyor 1 or recirculating loop 12 by the drive motors 15, provision is made for stopping the barrels and absorbing the shock resulting therefrom by a back-stop means, designated generally as 28, for both supply conveyor 1 and recirculation loop 12. For the purpose of absorbing the resultant shock or impact from the barrels striking the back-stop 28, a shock absorbing means has been provided which comprises a swingable arm 29 pivoted at the left-hand end and a dash pot device at the right-hand end which may be a cylinder member 30, containing a suitable oil or air medium, adapted to receive a piston (not shown) mounted on the end of a shaft 31 and pivotally connected to the end of arm 29.

As mentioned hereinbefore, packages or barrels 2 are arranged to pass along the main conveyor or header 3 through the dispatching station 5, which in general comprises a dispatching desk 32 for the establishment of each order to be diverted over each of the laterals and a push button arrangement for dispatching barrels 2 to the desired laterals, and a totalizing board, or device, 33 which is located adjacent to the dispatching desk. The purpose of the totalizing board 33 will become apparent from the detailed description given hereinafter. Likewise for purposes to be described more fully hereinafter in connection with the initiating circuit for the synchronous timing device in the dispatching of barrels, a light source designated generally as 34 is mounted on the side of the dispatching desk 32 and is arranged to throw a beam of light across the header 3 to a photoelectric cell 35 mounted on the opposite side of the header 3 so that a barrel passing along header 3 will interrupt the light beam.

With regard to the construction details of the laterals 6 which are supplied from header 3, reference is now made to Figs. 3 and 4 in which it will be understood that the laterals 6 are generally similar in construction details, and hence a description of one lateral will serve as an illustration of the details of the others. It will be understood that any number of these laterals may be employed and in actual installations may include 100 or more laterals.

As particularly shown in Fig. 3, a portion of the header, or main, conveyor 3 is provided with an inclined ramp section 36 for the purpose of raising the packages to a sufficient elevation to permit the laterals 6 to be of the inclined gravity type. In this way the barrels, or packages, 2 are pushed up ramp 36 by pusher bars 23 to a position adjacent the ends of laterals 6 over which they are to be routed. Then, by means of the remote control operating system provided through dispatch desk 32 and synchronous timer means 8, deflector device generally designated 7 may be operated to cause the packages to move from the header 3 onto the desired lateral.

As shown in diagrammatic form, deflector device 7 may be of the air-actuated piston and cylinder type mounted upon a base 38 which provides a pair of sliding tracks 39 on either side of the cylinder block 40 and so arranged that the piston element (not shown) mounted on shaft 41 may be operated to extend and retract deflector arm 42 across header 3. Since the forward portion of deflector arm 42 has an inclined angle of approximately 45°, the barrels striking the deflector arm will be moved onto the laterals. The inclined face 43 of deflector arm 42 may be provided with a plurality of rubber rollers 44 in order to reduce the friction between the deflector and the packages and reduce the shock of the moving barrels striking the extended deflector.

As shown, laterals 6 may be of the conventional gravity type for a roller conveyor system upon which articles are permitted to accumulate along the length of the lateral so that an order may be at least partially assembled thereon after the desired segregation of article for that order has been made. In order to store the barrels along laterals 6, a power-driven section has been provided at the lower end of laterals 6. This power-driven section is designated generally as 45 and is adapted to be driven by a motor 46 through a conventional sprocket and chain drive for the individual rollers. Since it is desirable to operate power-driven section 45 only when a barrel is present at the lower end of the gravity section, a switch mechanism operated by lever, or trip, bar 47 is provided at the upper end of power-driven section 45. The function of lever bar 47 is to operate the drive motor switch only when a barrel or package is resting on the lever bar 47 and drive the barrel only to the point where the barrel clears the bar.

For the purpose of stopping the barrels along the end of the laterals 6 I have provided a pair of pins 48. Since it is also desirable to prevent drive motor 46 from continuing to turn after the power-driven section 45 is full of packages, provision may be made whereby the first drum to contact stop pins 48 will open a switch to open the power circuit of motor 46, even though switch bar 47 is depressed.

For the purpose of preventing additional drums from being introduced to the laterals 6 when the lateral has been completely filled, an electrical circuit (to be described more fully hereinafter) is arranged to be actuated by a switch bar 49 adjacent the entrance or header end of the laterals 6 so that when switch bar 49 is depressed the deflector circuit is electrically locked out.

It will be understood that pin members 48 at the end of the laterals 6 may be either remotely, or locally, operated when it is desired to release the barrels, or packages, collected along a particular lateral to the exit or delivery header conveyor 10. As shown in Fig. 3, pins 48 have been depressed and the barrels designated "L" have been admitted to the foot section 10, which in turn is driven by drive motor 11 which is adapted to drive both conveyor section 50, common to all of the laterals 6, as well as the conveyor section 51 which is interconnected to the station designated as Dock A. As diagrammatically shown, motor 11 may be provided with a gear box 52 in order to drive the rollers in both sections 50 and 51 through conventional sprocket and gear mechanisms.

In order to actuate the counting devices provided for each of the laterals so that the total number of barrels passing out of a particular lateral may be registered, a trip bar 53 is provided on the conveyor section 50 adjacent to the ends of each of the laterals in the direction of the flow of the packages to the shipping, or storage, area. In this way each package passing over the trip bar 53 may give a momentary actuation of a switch means for each depression of the bar.

With regard to the return, or recirculation, loop 12 shown in Fig. 4 it will be apparent that the elevation of the barrels, or packages, on the header 3 may be utilized to advantage to cause packages which have either not been segregated to one of the laterals, or rejected due to the laterals being full, to flow by the force of gravity on the return loop 12 back to the point of re-introduction shown in Fig. 2.

It will be understood that the foregoing description of the conveying system is merely illustrative of the type of conveyor which could be employed with the control system disclosed in the present specification, since it will be apparent that minor modifications of the control system can be made to accommodate various modifications of the conveyor system per se. For example the particular means for propelling barrels 2 over the various conveyor sections may be modified to include different driving means such as gravity, pusher bars, individually powered rollers, sprocket and chain or other conventional devices.

Figure 5:
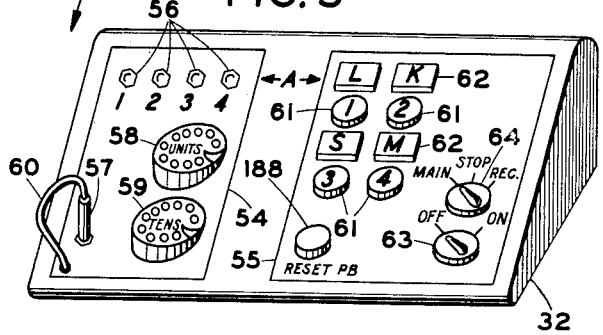
Fig. 5 is an enlarged view of the dispatching station showing the arrangement of the order set-up section and the push button control system as mounted on the dispatch desk, and the totalizing board or indicating device utilized in the registration of the total number of packages to be dispatched both to and from the laterals.

Proceeding now to the description of the control system contemplated by the present invention, reference is made to Fig. 5 and in particular to the dispatching panel, or desk, 32. Primarily for the convenience of the single operator of the control system, dispatching panel 32 is provided with a sloping face and mounted upon a suitable base member, as shown in Fig. 2. Dispatching desk 32 in general comprises an order set-up portion at the left-hand side designated generally as 54, and a dispatching section designated generally as 55, on the right-hand side of the desk.

Figure 9:
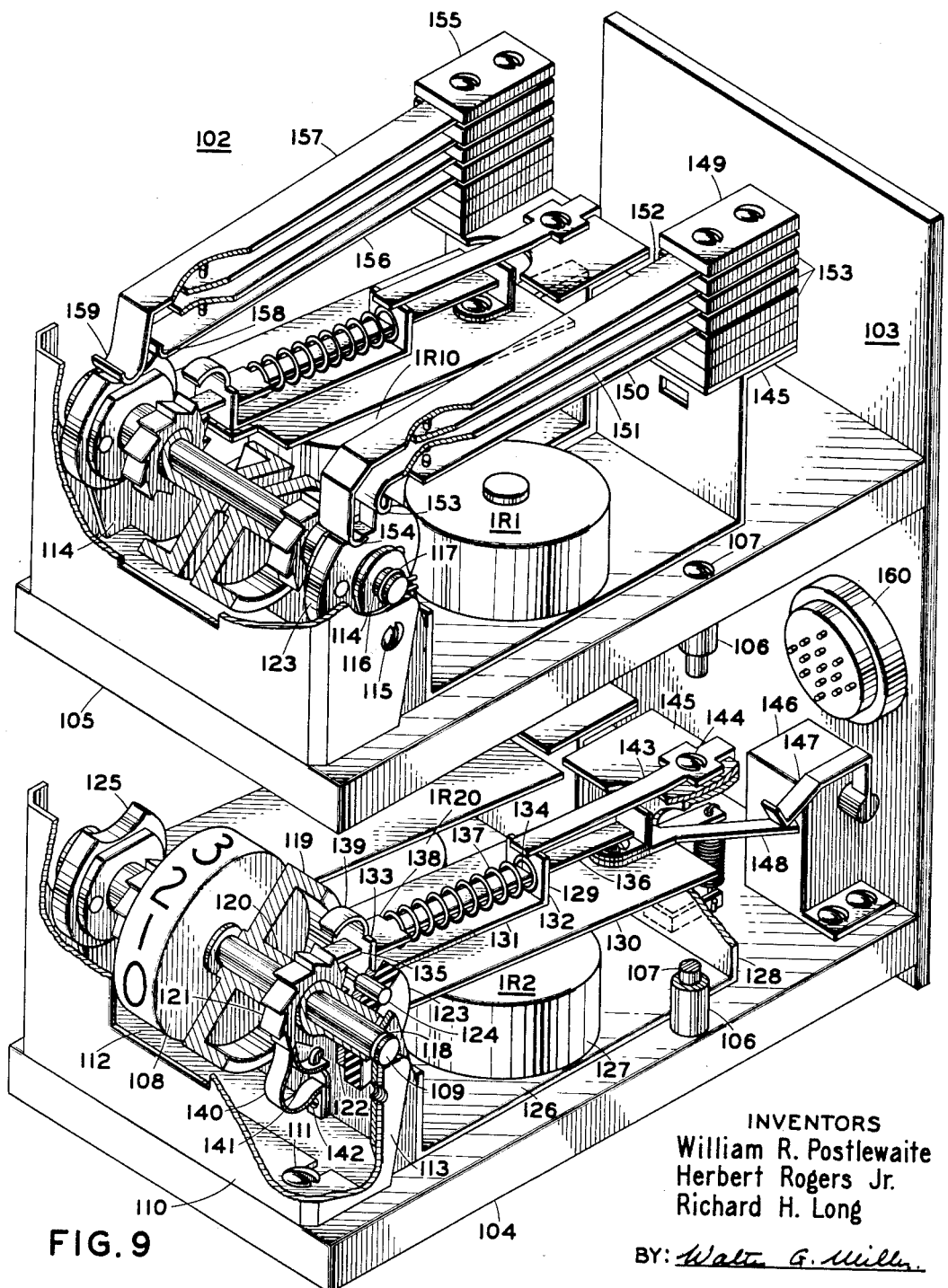
Fig. 9 is an enlarged view of the totalizing devices utilized in the totalizing board, as shown in Fig. 5, with the cover and a portion of the operating mechanism broken away to show the structural details.

As shown, order set-up section 54 includes a plurality of jack plugs 56 designated "1, 2, 3 and 4," which correspond to the laterals 6 of the conveyor system, a jack 57 adapted to be introduced into any of the jack plugs 56, as well as dial switch means, such as units dial 58 and tens dial 59, which may be used in dialling the total order to be routed over any of the four laterals. Units dial 58 and tens dial 59 are preferably of the telephone dial type capable of actuating a switch as many times as the number dialled. However, in the present application it has been found convenient to reverse the number order so that in dialling "9" the switch will be actuated once, twice for "8," etc. The purpose of this arrangement will become apparent in connection with the description of the total indicating devices, as shown in Fig. 9. For convenience of storage, jack plug 57 may be mounted upon a spring return cord 60.

The dispatching section 55 of the dispatching desk 32 includes push buttons 61 designated "1, 2, 3 and 4" corresponding to the respective laterals in the conveyor system. Associated with each of the push buttons 61 is an indicating panel, designated generally as 62, which may include three colored indicator lamps, as will be described more fully with regard to Fig. 6. A start-stop, or on-off, switch 63 is provided for starting and stopping the main conveyor drive system, and a control switch 64 has been provided for controlling the introduction of barrels from either the main supply conveyor 1, or recirculation loop 12, as will be described more fully hereinafter. The indicating panel 62 may be marked with the letters, "L, K, S and M" to correspond to the markings on top of the barrels 2, which may be indicative of either the type of contents, or the ultimate destination of the packages, and serve only the purpose of indicating to the operator of the control system where the barrels are to be segregated, as will be described in connection with the operation of the subject apparatus.

Figure 8:
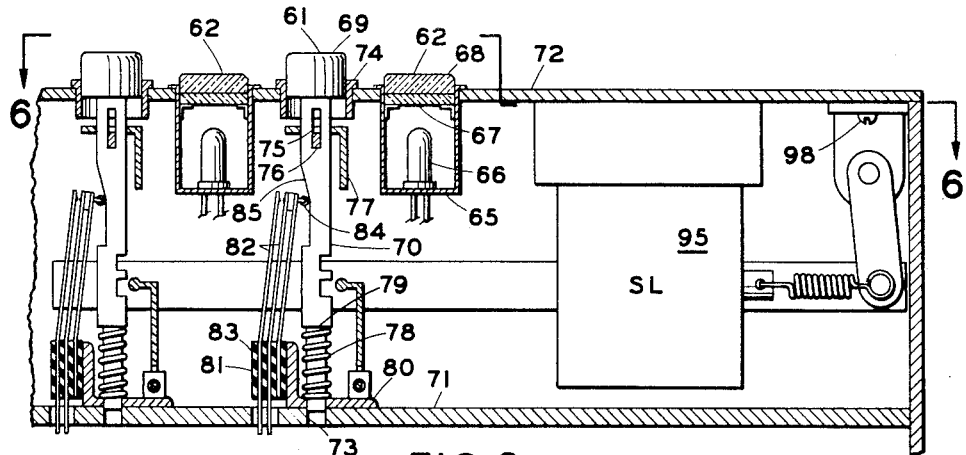
Figs. 7 and 8 are cross-sectional views in elevation along the lines 7—7 of Fig. 6 showing the operating push buttons, respectively, in their locked and unlocked positions.
Figure 7:
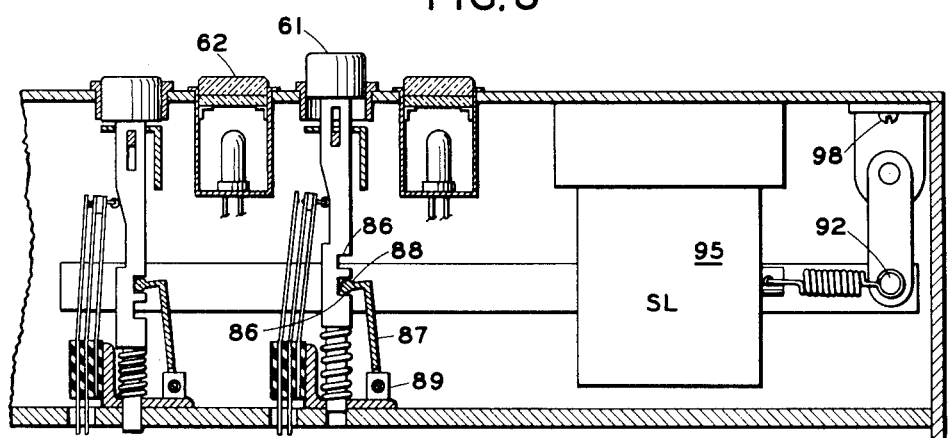
Figure 6:
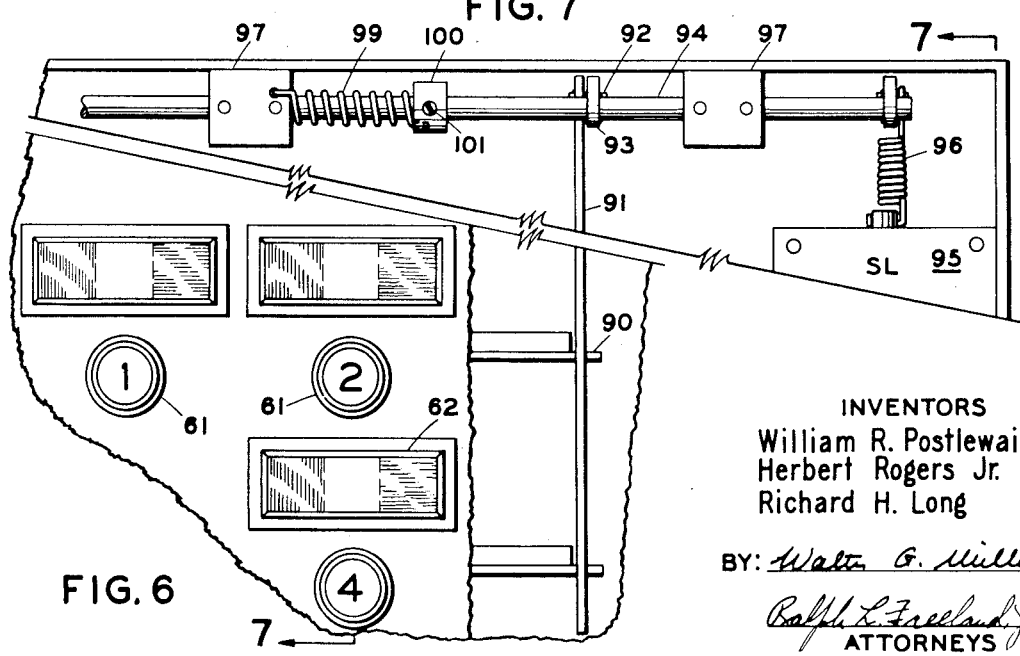
Fig. 6 is an enlarged plan view, partially broken away, of the push button control system shown in the right-hand portion of the dispatch desk in Fig. 5.

Reference is now made to Figs. 6, 7 and 8, in which the construction details of the dispatching section 55 of dispatching desk 32 are shown in detail. In order to show the status of an order routed over any of the four laterals, a three-element indicating device, designated generally as 62, has been provided which in general comprises a mounting bracket 65 capable of supporting three lamps 66 adjacent to each of the push buttons 61. Since it may be desirable to employ plain, uncolored lamps, provision is made for inserting a colored lens 67 of any desired color above the lamps 66, and a covering of plain plate glass 68 may be inserted above the colored lens 67. In the present arrangement a red indicator is provided for indications that a lateral has been filled, a green indicator that an order has been completed to the associated lateral and a white indicator to indicate that the lateral is cleared or emptied and hence the order completed.

As best seen in Figs. 7 and 8, push buttons 61 comprise a button element 69 mounted upon a switch, or plunger, bar 70, which is reciprocably mounted between the base plate 71 and the top plate 72 of the dispatch desk by means of a bore 73 in base plate 71 and a grommet, or bushing, 74 in the top plate 72 which is adapted to engage button element 69. To further insure the vertical movement of plunger bar 70, a slot 75 is provided in bar 70 which is arranged to engage a horizontally extending rectangular bar 76 supported by an angle element 77 which in turn is supported by the side members of the dispatching desk. For the purpose of holding the push button element 61 in the upward, or unactuated, position, a coil spring 78 is provided between an abutment 79 on bar 70 and an angle member 80 which provides support for switch element 81. Switch element 81 in general comprises a pair of leaf springs 82 mounted between insulating segments 83. For the purpose of making contact between the leaf springs 82, a sliding element, such as roller 84, is arranged to cooperate with a cam section 85 on switch bar 70.

In order to provide a mechanical interlocking arrangement for push buttons 61 in either a depressed, or undepressed, condition after one of the push buttons has been actuated, each of the plunger bars 70 is provided with a pair of notches 86. Notches 86 on plunger bars 70 are so located that a locking bar 87 is adapted to be rotated so that the beaded edge 88 on the upper extension of bar 87 will engage either of notches 86 on plunger bar 70. It will be apparent that the push buttons 61 may be arranged in a row alignment so that a single locking bar 87 will contact each of the push buttons in that row. Locking bars 87 may be pivoted at their lower ends on a mounting bracket 89 mounted on the end of angle members 80. As best seen in Fig. 6, the beaded portion 88 of locking bar 87 is provided with an extension designated as 90, adapted to engage an actuating lever 91, which in turn is arranged to rotate each of the locking bars 87 into the engaging position with notches 86 of switch bars 70. Actuating bar 91 is in turn operated by a linkage device comprising a pin 92 pivoted at the lower end of an operating arm 93 which is mounted on an operating shaft 94. Shaft 94 in turn is adapted to be operated by a locking solenoid 95, likewise designated as SL in the elementary wiring diagram, through a linkage similar to that described for the operating bar 91, through a spring 96. The purpose of the spring connection between the locking solenoid 95 and the pin 92 is to prevent possible damage to the locking elements in the event of accidental closing of the locking solenoid 95. It will be noted that operating shaft 94 is journaled in a pair of mounting brackets 97 adapted to be secured to the top cover 72 of the dispatching desk by any suitable means such as screws 98. In order to provide a spring return of the operating shaft 94, and also locking bar 91, to a position such as that shown in Fig. 8, a spring return mechanism has been provided which comprises a coil spring 99 with one end fastened to bearing support 97 and the opposite end secured to a collar 100 which in turn is secured to the operating shaft 94 by locking screw 101.

As set forth hereinbefore, one of the important features of the present invention is the provision of a continuously-indicating tallying system capable of indicating to the operator the exact status of the flow of containers, or barrels, from the header conveyor to each of the laterals as well as the subsequent dispatching of the barrels from the laterals to storage or shipment. Accordingly, the tallying devices or totalizing board, 33 has been provided, as shown in Fig. 2, adjacent to and viewable from the dispatching desk so that the operator of the conveyor system may be continuously apprised of the number of articles supplied to the lateral, and likewise the number removed from the lateral to the shipping dock or storage area. As best seen in Fig. 5, the totalizing board 33 is provided with a pair of total indicating devices for each of the laterals designated "1, 2, 3 and 4." As will be more completely described in connection with the electrical system utilized in the present dispatch control, each of the pairs of total indicators is arranged to be remotely operated by movement of the barrels in response to the dispatching system.

With regard to the mechanical construction of the total-indicating devices provided for each of the laterals, reference is now made to Fig. 9 wherein a preferred embodiment of the total-indicating devices is shown in a perspective view, partially broken away, to show the operating mechanism. As shown in Fig. 9, the totalizing device, designated generally as 102, comprises a back, or support, member 103 adapted to support thereon a pair of base elements, 104 and 105, which are mounted one above the other. Base elements 104 and 105 are arranged to support similar operating mechanisms for controlling the lower and upper number, or total, indicating devices and controls, respectively. Since the total indicators supported on bases 104 and 105 are similar, similar parts have in general been designated by the same members. Base members 104 and 105 are secured to the back 103 by any suitable means such as screws (not shown) and are further supported by an elongated spacer 106, through the center of which a long screw 107 (broken away) is extended to secure the base members in spaced relationship to each other. For the purpose of supporting the number wheels 108 which are arranged to be rotated on shaft 109, a shaft-supporting bracket, or member, 110 is provided which may be mounted on base 104 by means of screws 111. As shown, supporting bracket 110 is provided with an open portion, or window, 112 adjacent the front end of numbers wheel 108 so that the number appearing on the face thereof will be visible. In order to support the bearing, or shaft-supporting, bracket 110 and also to provide alignment with the relay construction adapted to operate the number wheels 108, bracket 110 is provided with a side-extending member 113 which is secured to a bracket member 114 supported on the relay frame by means of screws 115. Bracket 114 is provided with a bore 116 adapted to receive shaft 109 and serve as a bearing member therefor. Shaft 109 is adapted to be held by means of a clip spring 117 seated in a groove 118 formed in the ends of shaft 109. Number wheel assemblies 108 are arranged to rotate on shaft 109 independently of each other, and in general comprise a number wheel 119 having numbers from 0 to 9 embossed thereon and provided with an elongated shaft 120 upon which may be mounted a ratchet 121 and a cam-driving disc 122 to which a cam 123 is secured by means of pins 124 driven into a through-bore provided between drive wheel 122 and cam 123. While the construction of the units wheel assembly has been particularly shown, it will be understood that the only difference between the units wheel assembly and the tens wheel assembly will be the reversed numbering of the dial 119 and provision of a cam element 125 which differs from cam element 123 only in the position of a notch in the cam element.

For the purpose of driving the wheel assemblies 108 to any of the ten positions corresponding to the numerals 0–9, a relay designated generally as 126 having the usual coil 127 and the conventional flux-conducting path provided by the frame 128, a notching assembly, designated generally as 129, for actuating ratchet 121 is mounted on movable armature 130 of relay 126. The notching assembly 129 comprises a bracket member 131 having an upwardly turned rear end 132 and an upwardly turned forward section 133. Upturned sections 132 and 133 are provided with slots 134 and 135, respectively, for receiving a ratchet bar 136 which is slidable in openings 134 and 135. The forward end of ratchet bar 136 is adapted to engage ratchet wheel 121 when the relay armature 130 is actuated by coil 127. In order to urge the ratchet bar 136 into engagement with ratchet wheel 121, a compression spring 137 is seated between the upwardly-turned rear section 132 of ratchet assembly 131 and a notched section 138 in ratchet bar 136. For the purpose of preventing the ratchet element 121 from turning in the reverse direction, a looped member 139 is provided on the upper end of section 133 of the ratchet assembly. Likewise for the purpose of preventing ratchet 121 from turning in the reverse direction, a leaf spring 140 is mounted by means of a screw against the forward end of the relay frame. To prevent possible wear on this leaf spring, a wear element 141 may be interposed between the ratchet and the engaging face of leaf spring 140, with the opposite end of element 141 looped over a mounting bracket likewise secured to the relay frame by a mounting screw 142. To prevent over-travel of relay armature 130 when de-energized, a leaf spring 143 is secured by means of a screw 144 to a switch-mounting bracket, designated generally as 145, which is supported on the rear pole face 128 of relay 126. For a purpose to be explained in connection with the electrical circuit, a microswitch 146 having an operating lever 147 is mounted adjacent to back 103 of the counter assembly and is adapted to be operated by a rearwardly-extending lever arm 148 secured to the armature relay 130 in such a manner that operation of the relay will simultaneously operate microswitch 146.

As shown in the upper portion of Fig. 9, a leaf spring assembly designated generally as 149 has been mounted on bracket 145. Leaf spring assembly 149 in general comprises three leaves 150, 151 and 152, mounted between the usual insulating segments 153. As shown, leaf spring 150 is of the stationary type, while leaves 151 and 152 are movable by means of their downwardly-turned portions 153 and 154, respectively, which are adapted to cooperate with cam element 123. While leaf spring assembly 155, which is adapted to be actuated by the tens wheel assembly, is of a similar construction to leaf spring assembly 149, it will be noted that the cam-engaging ends of the movable leaves 156 and 157 are provided with forwardly-curved cam-engaging sections 158 and 159, respectively, for cooperation with cam 125.

For the purpose of making the electrical connections to the operating relays 1R1 and 1R10 for the upper number wheels as well as 1R2 and 1R20 for the lower wheels and their associated switch means, a multipoint connector 160 is provided in the mounting base 103. The wiring connections between plug 160 and the electrical elements has been omitted for the sake of clarity in the drawing, but will be apparent from the electrical circuit shown in Fig. 10.

Figure 10:
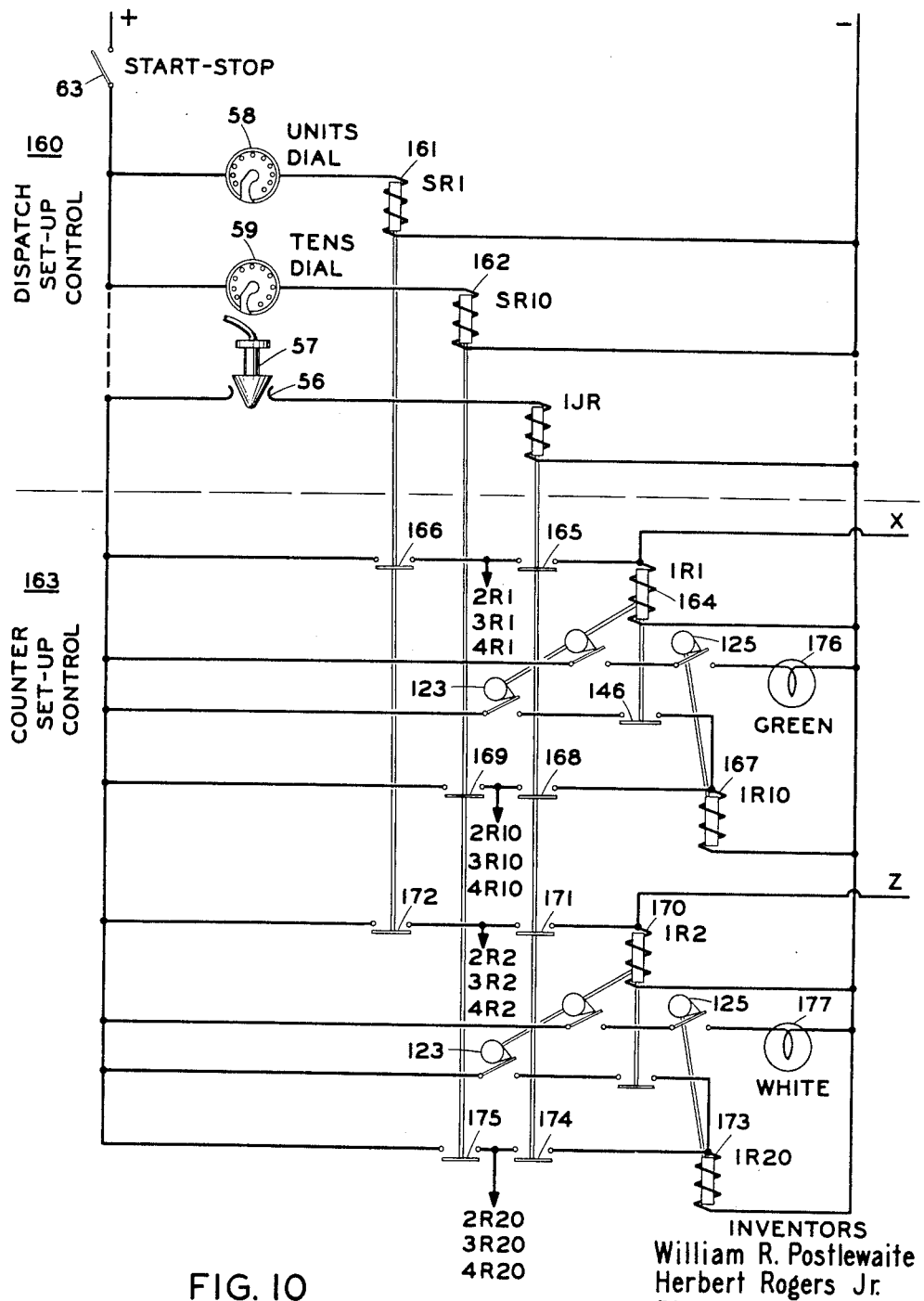
Figs. 10, 11 and 12 are circuit diagrams showing the elementary electrical control system for control of the conveyor system illustrated in Fig. 1.
Figure 11:
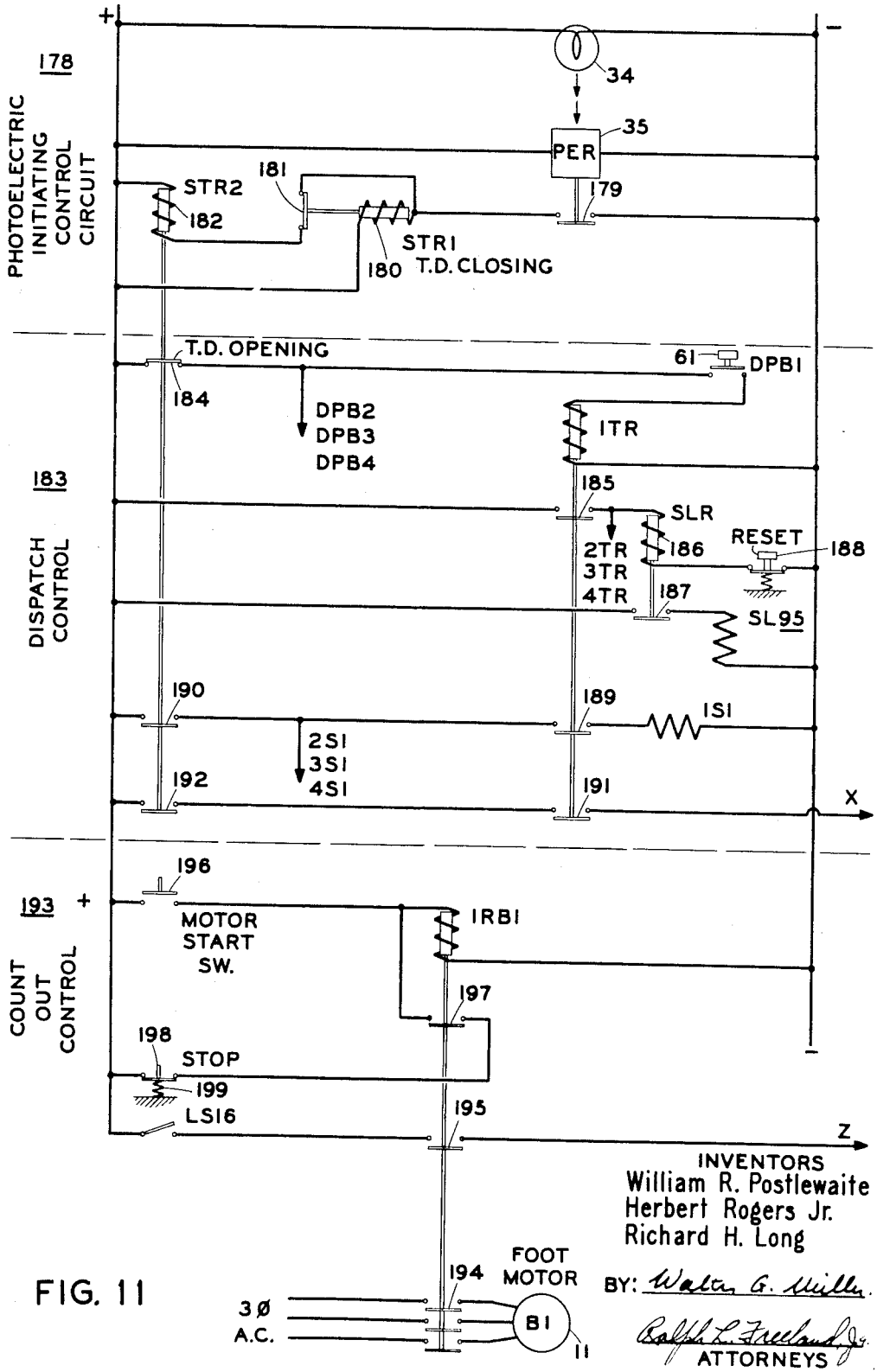
Figure 12:
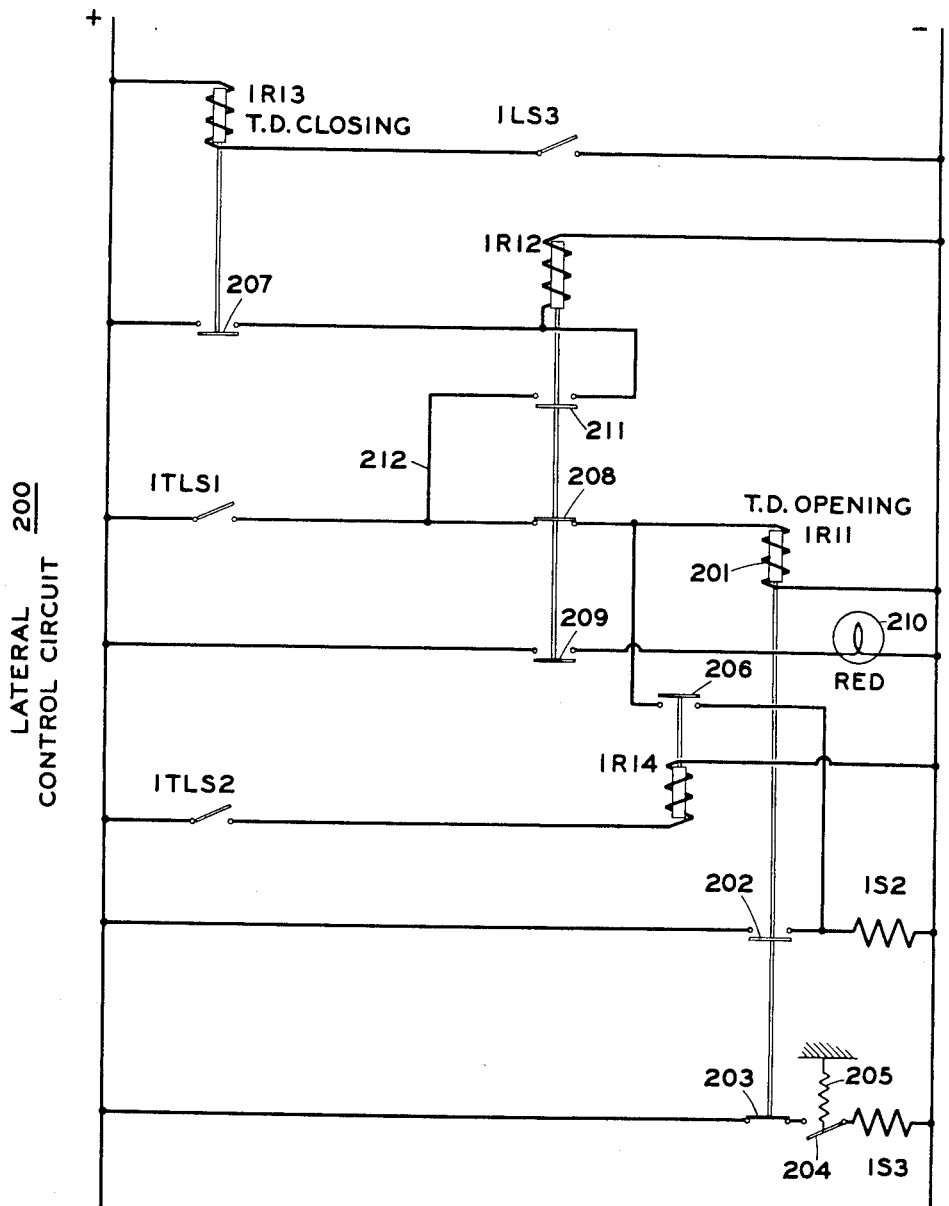

Proceeding now with a description of the electrical circuit which provides the control for the above-described conveyor system, reference is made to Figs. 10, 11 and 12, wherein the control system has been particularly set forth for the control of lateral 1 and the associated dispatching and tallying system for that particular lateral. For the sake of clarity, those particular units, which are to be utilized for the control of any of the laterals, have been designated in the elementary diagrams without a prefix number before the latter designation of the relay or switch involved. However, when the relays or switches are particularly connected with only a single lateral, the prefix of "1, 2, 3 or 4" is used before the letter designation to indicate the lateral of the same number. Further, when previously-identified control elements and relays have been identified, the same number is used wherever possible in the elementary diagram. While the control system may be operated by either A. C. or D. C., the present system will be described as though operated by D. C. for the sake of simplicity, but it will be understood that the system could be modified by well known means to utilize alternating current.

In the upper portion of Fig. 10, the dispatch setup control system, designated generally as 160, is adapted to be connected to an energizing source (not shown) through the start-stop, or on-off switch 63 located on the dispatch desk. Dispatch setup control section 160 includes a units dial switch means 58 which as stated before may be a telephone dial-type switch capable of making a momentary contact for each of the number positions on the dial, and in the present arrangement is connected between the positive side of the potential source and coil 161 of relay SR1 in such a manner that relay SR1 may be operated as many times as the number of momentary contacts dialled on the units dial 58. Tens dial means 59 is similar in type to dial means 58, as mentioned in the description of the dispatch desk, and is arranged to connect coil 162 of relay SR10 to the positive potential source in the same manner as coil 161 is energized by switch 58. For the purpose of selectively connecting the setup control to any of the desired indicating devices on the totalizing, or tallying, board, the jack 56 corresponding to the particular lateral so selected may be bridged by means of the jackplug 57, as explained in connection with the setup control provided by the dispatching desk to complete the circuit to the corresponding relay, such as 1JR, for the first lateral. It will be apparent that jackplug 57 may be interconnected to any of the other jack connetcions 56 for the other laterals, and thereby connect the corresponding relays 2JR, 3JR or 4JR to the potential source and thereby complete the circuits to the corresponding counter devices 102.

The lower part of Fig. 10 represents the control diagram for the counter setup control, as well as the elementary circuit for each of the counter devices 102. The counter setup control system is designated generally as 163 and may be energized by the same power source as dispatch setup system 160. It will be understood that the relay contacts completed by the operation of relays SR1 and SR10 in the dispatch setup control system are common to all of the counter units, and accordingly the interconnection to the remaining counter devices which have not been illustrated for the laterals 2, 3 and 4 are indicated by the destination lines designated 2R1, 3R1, and 4R1. As particularly shown, relays 1R1 and 1R10 are the operating relays of the upper counting wheels 108 in the tallying devices 102, and hence, serve the purpose of operating ratchets 121 to drive the number wheels one notch for each energization of relay coils 127 of the counting devices. Accordingly, coil 164 of relay 1R1 is adapted to be connected to the power source by contactor 165 operated by relay 1JR and contactor 166 operated by SR1. In a similar manner, the tens number wheel is adapted to be operated by the energization of the coil of relay 1R10 through contactor 168 of the 1JR relay and contactor 169 of the SR10 relay. Relay 1R2 which operates the mechanism for turning the units wheel in the lower indicator device, is adapted to be connected to the power source through contactors 171 of 1JR and 172 of SR1. Likewise, the coil of relay 1R20, which controls the lower tens wheel, may be connected to the power source through contactor 174 of 1JR and 175 of SR10.

Since the counter wheel actuating relays 1R1, 1R10, 1R2 and 1R20 are adapted to be operated at predetermined positions of the barrels on the conveyor system, external actuating circuits have been indicated as connected through lines X and Z, respectively, for the upper and lower numeral-indicating devices. First, with regard to the upper pair of tallying wheels which are arranged to indicate the number of packages dispatched to a particular lateral from the header, the actuating circuit is provided through line X which is connected to the coil of relay 1R1. It will be noted that this line is connected to the dispatch control section, shown in Fig. 11, and will be described more fully in connection with that circuit. However, it will be noted that an interconnecting circuit has been provided through the cam members in the counting devices for interconnecting the coils of relays 1R1 and 1R10 in certain positions. In this regard, as stated before, the dispatching of each barrel, or package, from the header to a lateral is accomplished by the single actuation of a dispatching push button. Hence, to move the tens wheel at the point when the total ends in zero and it is desired to count to the next lower number (for example, from 50 to 49), provision must be made to operate relay 1R10. Relay 1R10 may be so energized through the contactor 146, which as described in connection with the indicating devices was shown to be a microswitch adapted to be operated by each actuation of relay 1R1. Since it is desired to operate relay 1R10 only when the units-indicating wheel has been operated nine times, the connection of the coil of relay 1R10 to the power source is accomplished through leaf switch 149 which is arranged to be operated by cam 123 operated by the units wheel assembly 108 in the indicating device. The purpose of a double-break connection to relay 1R10 is to prevent the operation of the coil during the setup operation controlled by dispatch setup control 160. In order to avoid false indication by controlling the supply voltage to relay 1R10 only through the cam action of cam 123 and switch 149, the operation is so timed that when the units number wheel turns from 0 to 9, cam-operated switch 149 will close prior to the actuation of microswitch 146 and open prior to the next momentary closing of microswitch 146 by the subsequent actuation of relay 1R1.

It will be noted that a green signal light, indicated generally as 176, located on the dispatching panel, is arranged to be operated by the cam members 123 and 125 actuated by relays 1R1 and 1R10 respectively. The actuating circuit for the indicator light 176 is provided by the series connection of cam-actuated switches 149 and 155 which are arranged to be actuated only when both the units and tens wheels are in the zero position. By this arrangement, an indication is presented at the dispatching desk that the order originally set up on the dispatching indicators has been completed from the header conveyor to the associated lateral.

Since the lower indicator wheels actuated by relays 1R2 and 1R20 are adapted to be operated by the movement of packages from the lateral to the foot, or common, exit conveyor 10, a control circuit is provided through line Z, interconnected as shown in Fig. 11, to the lateral count-out control. The interconnection of relay 1R2 with 1R20 through the cam-operated switch and microswitch 146 is in the same manner as that shown for 1R10. Likewise the control of the white indicator light 177 on the dispatch control panel is provided through cam-actuated switch 149 operated by the lower units wheel and cam-actuated switch 155 operated by the lower tens wheel. These cam-actuated switches are likewise adapted to be closed when both the tens and units wheels of the lower indicators are in the zero position, so that the white indicator light 177 is lit only when a complete order has been dispatched from the lateral to the shipping, or storage, dock.

Referring now to the section of the control circuit particularly shown in Fig. 11, and more specifically to the upper portion thereof labeled as the photo-electric initiating control circuit and designated generally as 178, it will be noted that extreme flexibility in the operation of the control system has been provided by the inter-relationship between the actuating push buttons 61 on the dispatching panel, and the actual initiation of the dispatching operation by the position of the photoelectric control circuit. This control is provided by the lamp 34 which is located on the side of the dispatching desk so that the beam of light striking the photoelectric relay 35 is adapted to be interrupted by the passage of the drums, or packages, along the header conveyor, and thereby establish an exact point for controlling the time and distance travelled by the package prior to the operation of the deflecting devices adjacent the ends of each of the laterals. Accordingly photoelectric initiating control circuit 178 controls the dispatching of each package to any of the associated laterals. As contemplated by the present invention, photoelectric relay 35, designated PER in the drawing, is adapted to be actuated upon the light beam generated by lamp 34 falling upon the photoelectric cell of photoelectric relay 35 which is adapted to close contactor 179 and thereby energize coil 180 of relay STR–1 by completing the circuit to the negative side of the power source. When coil 180 of relay STR–1 is so grounded, contactor 181 controlled by STR–1 is adapted to ground coil 182 of relay STR–2 for a predetermined period of time, since the armature of STR–1 is of the time delay type and contactor 181 is normally closed. Since photoelectric relay 35 is adapted to be actuated only when the beam is established, coil 180 of relay STR–1 will be energized until the beam is interrupted by the passage of a package on the header to establish the initiating circuit for relay STR–2 so that it may perform the desired operation of controlling the dispatching system.

Referring now to the dispatch control section, designated generally as 183, it will be noted that push buttons 61, designated DPB–1 for the first lateral, is arranged to complete the circuit to relay 1TR through contactor 184, which is of the normally closed time delay opening type, under the control of relay STR–2 in the photoelectric initiating circuit. Relay 1TR is in turn arranged to control contactor 185 which provides an energizing circuit for coil 186 of relay SLR. Relay SLR in turn controls contactor 187 which is adapted to connect the locking solenoid SL, hereinbefore designated as 95, in the dispatch desk which serves the purpose of mechanically interlocking the push buttons 61 in the depressed, or undepressed, position. It will be noted that by this locking operation push button DPB–1 is held in its depressed position so that relay 1TR is maintained in the energized position which in turn holds relay SLR and locking solenoid SL in their energized positions. A reset push button 188 has been provided in the negative side of the energizing line to relay SLR, so that push button 61 may be reset, in case an erroneous selection has been made by the operator, prior to the arrival of the barrel in a position where the light beam to the photoelectric relay may be interrupted. By the depression of reset push button 188, coil 186 of relay SLR is de-energized and this in turn will deenergize locking solenoid 95. The opening of locking solenoid 95 releases push button DPB–1 thereby interrupting the circuit to the coil of relay 1TR.

Provision is made for the remote control operation of deflector mechanism 7 adjacent the end of the first lateral through timer solenoid 1S1. Solenoid 1S1 is adapted to operate a mechanical arrangement in the synchronized timing device 8 in such a manner that the mechanical device so actuated will operate a pair of switches in the lateral control circuit at the exact interval desired so that the deflector arrangement is placed across the header conveyor prior to the arrival of a barrel to be routed over such lateral. One device satisfactory for this timed operation is that disclosed in Patent No. 2,217,342 to Ladrach. As disclosed therein a wheel, having a plurality of pins slideable axially in the rim of the wheel and adapted to be displaced by the operation of a solenoid, is provided for each lateral. Said wheel is adapted to be driven in synchronism with the movement of the main conveyor and when in the desired space relationship corresponding to the movement of a barrel from the dispatching station to the desired lateral, the mechanically displaced pin, each of which corresponds to one of the spaced pusher bars, is adapted to operate a pair of switches in the lateral control device. Accordingly, in the present arrangement solenoid 1S1 is adapted to be connected to the power source for momentary actuation through contactor 189 of relay 1TR and in turn through contactor 190 of relay STR2 in the photoelectric initiating control circuit. By this arrangement, contactor 189 is closed as soon as the push button DPB1 is depressed and then by passage of a barrel between the lamp source 34 and photoelectric relay 35 the actuation of solenoid 1S1 is completed by contactor 190 of STR2.

Actuation of the upper units number wheel on the tallying device 102 is accomplished, in much the same manner, through line X as referred to hereinabove, since this line is connected to the source of power through contactor 191 operated by relay 1TR and contactor 192 operated by relay STR2. It will be apparent that each of these circuits to the timer solenoid 181 and the tallying device through line X are arranged to be deenergized by the opening of contactor 184 operated by relay STR2 which controls the energization circuit of relay 1TR through push button DPB1. However, as mentioned before, contactor 184 is of the time delay opening type so that the predetermined time delay in the opening of contactor 184 permits the momentary energization of the timer solenoid and the relay 1R1 for operating the units number wheel of the tallying device before the push button circuit is de-energized.

Referring now to the lateral count-out control circuit, designated generally as 193, it will be noted that the tallying device representing the lower pair of number wheels is adapted to be actuated through line Z. In order to energize this counting circuit, provision is made for the operation of the foot, or common, conveyor system through foot motor, B1, which is adapted to be connected to a 3-phase A. C. line through contactors 194 which are operated by relay 1RB1. Relay 1RB1 likewise carries a contactor 195 connected in series circuit to line Z for the purpose of connecting this line to the power source through a limit switch designated LS16. This limit switch is adapted to be actuated by the depression of bars 53 which are located on the foot, or common, conveyor section in such a position that articles moving from the lateral must pass over the bars 53 when being conveyed to dock A. The purpose of the interposition of contactor 195 between limit switch LS16 and the tallying device operated by line Z is to insure that operation of the common conveyor is under the control of the corresponding lateral. In this way, only when the motor is driven through control of the associated lateral will the passage of a package over the limit switch LS16 operate the proper counting device.

A conventional starting and stopping circuit for foot motor 11 is provided by a motor start switch, designated generally as 196, which is arranged to momentarily complete the circuit to the coil of relay 1RB1. A lock-in circuit is then provided for the coil of 1RB1 through contactor 197 actuated by the relay to complete the circuit through stop switch 198 which is held in a closed position by spring 199.

Reference is now made to the circuit shown in Fig. 12 and designated generally as lateral control circuit 200. In general this circuit comprise a control means for the operation of the deflector mechanisms opposite the end of each of the laterals. These deflectors are operated in response to the position of the pins in the synchronous timer device 8 which corresponds to the position of the packages, or drums, being conveyed on the header conveyor 3 so that the deflector is presented across the lateral just prior to the arrival of a barrel designated to travel over that partcular lateral. As mentioned before, the synchronous timing arrangement provided by timer device 8 includes a pair of switches adapted to be operated by the pin displaced by timer solenoid 1S1 mentioned in connection with the dispatch control circuit. These switches are designated generally as 1TLS1 and 1TLS2 and are preferably so arranged that 1TLS2 is adapted to close first, and then open prior to the actuation of 1TLS2. The purpose of this arrangement will become apparent in connection with the description of both the rejection of barrels after the lateral has been completely filled, and the holding of the deflector in its extended position when two or more barrels in sequence are to be deflected onto the same lateral.

As mentioned in connection with the description of the deflector devices 7, provision has been made for either pneumatic, or hydraulic, actuation of the piston and cylinder arrangement and for the control of this mechanism a pair of solenoids 1S2 and 1S3 have been provided for the electrical control of the movement of a control valve for directing the operating fluid to either extend or retract the deflector mechanism at the desired intervals. For the purpose of controlling the deflector control solenoid, relay 1R11, having its coil 201 connected to the power source through timer switch 1TLS1, is provided with a pair of contactors 202 and 203 in the energizing circuits of the solenoids 1S2 and 1S3, respectively. It will be noted that contactor 203 is of the normally closed type so that when relay 1R11 is de-energized, solenoid 1S3 will be energized through contactor 203. However, since it is desirable to remove the potential from solenoid 1S3 after the deflector mechanism has been retracted, a mechanically actuated switch 204 is so located on the deflector mechanism that when in the retracted position the switch will be opened, but in all other positions spring 205 will cause switch 204 to close to energize 1S3. Energization of solenoid 1S2 which controls the extension of the deflector mechanism is through contactor 202 operated by relay 1R11 which is normally energized by the closing of switch 1TLS1. A further energization circuit for deflector extending solenoid 1S2 is provided by a circuit completed by the operation of limit switch 1TLS2 which is operated prior to the operation of 1TLS1. The purpose of this arrangement is to prevent the operation of the deflector mechanism when successive barrels, or packages, have been dispatched to a single lateral so that solenoid 1S2 may be maintained in an energized position. To accomplish this purpose, limit switch 1TLS2 is adapted to energize a relay 1R14 so that contactor 206 controlled by that relay completes a circuit through contactor 202 of relay 1R11 to energize coil 201 of relay 1R11. Since relay 1R11 is of the time delay opening type, it is possible to maintain the contactor 202 in the closed position following the opening of limit switch 1TLS1 until such time as the succeeding pin on the timing device is adapted to operate limit switch 1TLS2, and thereby complete the energizing circuit for relay 1R11 through contactor 202 of relay 1R11 and contactor 206 of relay 1R14. After 1TLS2 has opened, relay 1R11 is closed in the normal manner by the operation of 1TLS1 by the same pin in the synchronous timer.

Since in he present conveyor system it is desirable to accumulate, or store, the barrels along the length of the laterals and since the total order to be routed over a particular lateral may require more barrels or articles than can be stored on the lateral, provision has been made for by-passing the barrels after the lateral has been filled so that no further barrels can be deflected to the lateral after it has been filled. For this purpose limit switch 1LS3 is arranged to be actuated by barrel-actuated bars 49 on the lateral so that when a package is resting on bar 49 limit switch 1LS3 will be actuated. Switch 1LS3 in turn controls the energization of the coil of relay 1R13 which is of the time delay closing type for a purpose to be explained herein. Relay 1R13 controls contactor 207 which in turn controls the energization of the coil of relay 1R12. Then, by virtue of normally closed contactor 208 which is operated by relay 1R12, the energizing circuit for coil 201 of relay 1R11, is arranged to be opened by the closing of relay 1R12. Simultaneously, contactor 209 which is normally open and likewise controlled by relay 1R12, is arranged to complete the circuit for the red indicator lamp 210 which is located at the dispatcher's desk so that a visual indication may be given to the operator that the particular lateral is full and thereby warn him that further barrels should not be routed to that particular lateral. While the above-mentioned circuit serves to prevent barrels from being dispatched to a lateral after the lateral has been filled, under certain operating circumstances the condition may prevail when barrels have been dispatched by the operator with the lateral full while simultaneously barrels are being withdrawn from the lower end thereof in order to supply the barrels to the shipping dock or warehouse. With the barrels thus being withdrawn from the lower end of the lateral, limit switch 1LS3 may be opened so that relay 1R13 could thereby be de-energized and likewise permit relay 1R12 to become de-energized, to permit normal operation of the solenoid operating relay 1R11. However, under these circumstances there is the danger of late operation of the deflector mechanism which arises by the closing of limit switch 1TLS1 by the synchronous timer operated mechanism. To prevent this late operation of relay 1R11 by the closing of contactor 208 while 1TLS1 is open, a holding circuit for relay 1R12 is provided through contactor 211 so that relay 1R12 will remain energized through the by-pass circuit provided by line 212. In this way, limit switch 1TLS1 merely completes the circuit through line 212 and contactor 211 to energize the coil of relay 1R12 and prevent relay 1R12 from becoming de-energized by the opening of limit switch 1LS3. Thus, 1TLS1 may be closed without causing the late operation of the deflector mechanism.

Operation of the above-described control system as applied to a conveyor system in accordance with the foregoing description is as follows:

The operator first determines which of the laterals certain orders are to be routed over and the total number of barrels, or drums, to be so routed. This selection is made by removing the jack 57 from its normal storage position and inserting it in jack plug 56 for the particular lateral to be selected, as for example lateral 1. To establish the order on the pair of total indicating devices, the operator then establishes the proper totals by dialling the corresponding units number, which may, for example, be 7. This will accordingly energize coil 161 of relay SR1 three times due to the arrangement of number order on the number wheels. Since relay 1JR is energized by the insertion of jack 57 in jack plug 56, both the upper and lower wheel relays 1R1 and 1R2 are correspondingly actuated three times and thereby rotate the units number wheel from 0, the normal position, to 7. If for example the complete order is 77, the tens wheel relays 1R10 and 1R20 must likewise be actuated three times. Accordingly coil 162 of relay SR10 is energized three times by the closing of contactors 169 and 175 in the circuits of the coils of relays 1R10 and 1R20 respectively. As mentioned before, since relay 1JR is energized, contactors 168 and 174 are likewise closed in the 1R10 and 1R20 circuits. In this way the tens number wheels on both the upper and lower indicator devices are actuated to bring "7" on the tens wheel into view. After the set-up operation has been completed, jack 57 is removed from plug 56 so that the set-up circuit control is deenergized to prevent further operation of the set-up mechanism. However, it will be understood that each pair of indicator devices corresponding to a particular lateral may be operated independently of any other pair by merely inserting the plug 57 in the desired lateral jack plug 56.

With the desired totals established on the pairs of indicator devices 1, 2, 3 and 4 corresponding to the laterals, switch 64 is then moved from its "stop" position to either the "main" or the "recirculation" loop positions to start drive motor 15 which operates the chain and sprocket driven rollers of the supply lines. Assuming that no barrels have been received by the system, switch 64 will be turned to operate main supply line 1. Main conveyor motor 17 is then started through switch means provided by switch 63 so that the pusher bars 23 may be operated to move barrels along main, or header, conveyor 3. Operation of main drive motor 17 in turn operates the escapement mechanism provided by pins 24 which are arranged to simultaneously admit one barrel and prevent the movement of the next succeeding barrel so that only a single drum will be admitted to the conveyor at intervals corresponding to the arrival of each of the pusher bars 23. Motor 15 driving the drums on the supply conveyor 1 is preferably driven at sufficiently high speed to enable the drums to arrive on the header 3 ahead of the next succeeding pusher bar 23. Accordingly, to prevent breakage and shock to the drums entering header 3 at high speed, hydraulic shock absorber means 28 is provided.

With the drum thus received on the header conveyor 3 the operator is prepared to make the selection of the particular lateral over which the drum is to be routed by visual inspection of the usual destination marking or the product-identifying label so that selection may be readily made of the proper lateral. As shown in Fig. 5, corresponding letters may be marked on the dispatch-indicating plate 62 to assist the operator in making the proper selection. For example, as there indicated, the drums marked "M" on the top may be designated for lateral 4, whereas those marked "K" are designated for lateral 2. Hence, in the operation of the dispatching station the operator would select push button 61 marked 1 for the drums designated "L." Upon the operation of push button 1, relay 1TR serves to operate contactor 185 to energize coil 186 of relay SLR. This in turn operates contactor 187 to complete the operating circuit for relay SL. As described in connection with the details of the dispatching desk, locking solenoid 95 operates the locking mechanism to hold the push button 61 in its depressed position. This is accomplished by locking solenoid 95 operating locking bar 91 in the dispatching desk which rotates bars 87 into the slots 86 in the plunger bar 70 of push button 61 to lock push button 1 in its depressed position and the remaining push buttons in the "up" position. Following this actutation of push button 61 the drum proceeds along header conveyor 3 to the indexing station provided by photoelectric relay 35 and light source 34, which are located adjacent the end of the dispatching desk. In the event that an improper selection of laterals has been made, the push buttons 61 may be reset by operation of reset button 188 which de-energizes relay SLR, and in turn opens locking solenoid SL95 and thereby permits reselection of another push button.

Assuming that the proper push button has been selected, the photoelectric initiating control circuit 178 is then adapted to take over the control of the actual dispatching of the barrel to the proper lateral. This is accomplished by the interruption of the light beam between lamp source 34 and photoelectric relay 35 by passage of the barrel. Since photoelectric relay 35 is of the type to be energized only when the light source is established, passage of a barrel de-energizes photoelectric relay 35 and thereby opens contactor 179, which in turn de-energizes relay STR1 thereby permitting contactor 181 controlled by relay STR1 to return to its normally closed position to complete the ground circuit to coil 182 of relay STR2.

Following the passage of the barrel, the light beam from lamp source 34 immediately re-establishes the circuit to photoelectric relay 35, thereby closing contactor 179 and simultaneously energizing coils 180 and 182 of relays STR1 and STR2, respectively. Since relay STR1 is of the time delay closing type, contactor 171 will maintain the circuit previously completed to energize coil 182 of relay STR2 for a prescribed period of time. During this prescribed period of time, coil 182 of relay STR2 is energized to close contactors 190 and 192 which control the operation of timer solenoid 181 and the counter device circuit energized through line X. In this manner, a properly synchronized impulse, dependent upon the passage of the drum, is established for energizing the timer solenoid 1S1 and simultaneously actuating the units or digits number wheel on the upper counting device to subtract a digit, or unit, from the total previously established on the counting device. By this latter arrangement the operator is continuously apprised of the total number of drums yet to be dispatched to the lateral since the passage of each drum subtracts one number from the total on the upper indicating device. Relay STR2 likewise controls the re-establishment of the neutral position for the dispatching desk by actuating time delay opening contactor 184, which is delayed just sufficiently to permit relay 1TR to hold closed contactors 189 and 191. Contactors 189 and 190 respectively control counting solenoid 151 in the synchronous timing device 8 and the counter device operating circuit through line X to relay 1R1. However, since only a momentary impulse is required for establishment of the circuits to solenoid 1S1 and relay 1R1, the re-establishment of the push button system in the dispatching desk may be accomplished by the delayed opening of contactor 184.

Following the establishment of the particular lateral over which the drum is to be dispatched, the drums are moved forward by pusher bars 23 driven by the main drive motor 17 which likewise operates the gear reducing mechanism 9 for driving synchronous timing device 8 in exact synchronism with the movement of the barrels along the header conveyor 3. The synchronous timing device 8 is provided with a wheel for each lateral in the system and each wheel carries a plurality of pins corresponding to each of the pusher bars 23 on the main conveyor. The two limit switches, designated 1TLS1 and 1TLS2 in Fig. 12, are so positioned with relation to the pins in the timer wheel that just prior to the arrival of a barrel opposite the end of the corresponding lateral over which it is to be routed, limit switch 1TLS2 will be actuated by the timer pin which has previously been driven out of its normal position by timing solenoid 1S1. While limit switch 1TLS2 actuates relay 1R14, as mentioned in the detailed description, this particular circuit serves only to prevent repeated operation of the deflector mechanism when successive barrels have been dispatched to the same lateral by successive pins in the timer wheel being extended. Accordingly, the first actuation of the deflector mechanism 7 is provided by the closing of limit switch 1TLS1 by the same pin which actuated 1TLS2 to complete the operating circuit for the closing of coil 201 of relay 1R11 through normally closed contactor 208 of relay 1R12. With relay 1R11 thus energized, contactor 202 is closed to complete the circuit to energize solenoid 1S2 which controls the fluid flow to move the deflector mechanism forward. If the succeeding pin in the timer mechanism has likewise been driven out of its normal position to route the succeeding barrel over the same lateral, relay 1TLS2 will be closed to energize coil 201 of relay 1R11. It will be apparent that since relay 1R11 is of the time delay opening type, the removal of power from coil 201 by the opening of 1TLS1 will not permit the contactor 202 to open immediately, and hence the closing of 1TLS2 by the subsequent pin in the timing device will complete the energizing circuit of relay 1R14 to close contactor 206 and thereby re-energize coil 201 of relay 1R11 through contactors 202 and 206. Relay 1R11 may then remain closed until such time as limit switch 1TLS1 is again closed. Following the passage of the barrel down the lateral, relay 1R11 becomes de-energized thereby permitting contactor 203 to again close and through the spring closed switch 204 establish the circuit to the closing solenoid 1S3 for reversing the fluid flow to retract the deflector mechanism.

In the event that the lateral has been filled with barrels to such an extent that a barrel is resting upon the operating bar 49, limit switch 1LS3 will be closed to prevent the control system from attempting to force further drums into the lateral, even though subsequent drums have been dispatched to that particular lateral. This protective circuit is provided by the closing of limit switch 1LS3 which is adapted to energize relay 1R13 to close contactor 207 which in turn controls the energization of relay 1R12. Relay 1R12 serves to open contactor 208 and simultaneously close contactor 209 to energize the red indicator lamp 210 on the dispatching desk. However, as mentioned before, in the event that barrels are being drained from the lateral to the shipping dock by the operation of foot section 10 through the removal of the stop pins 48 at the end of the lateral, provision is made to prevent operation of the deflector mechanism at a point late in the cycle which would incur the hazard of jamming the barrels and perhaps crushing them by deflector device 7 striking the packages while passing the lateral. This protective circuit is provided by contactor 211 which completes a circuit through line 212 to the coil of relay 1R12 so that with limit switch 1LS3 opened by the removal of drums from bar 49 the previous operation of limit switch 1TLS1 by a pin in the timer mechanism will serve only to maintain relay 1R12 in an energized condition and thereby prevent the late operation of relay 1R11 until such time as limit switch 1TLS1 is opened by the passage of the particular actuating pin to thereby reestablish the normal operation of the lateral control circuit.

For the operation of the shipping conveyor 10, foot motor 11 is adapted to be actuated by a normal motor starting switch 196 which will energize relay 1RB1 to close contactor 197, thereby holding 1RB1 in an energized condition, and simultaneously close the three contactors 194 for applying three-phase, A. C. current to foot motor 11. The reason for this particular arrangement is to provide control of the foot or exit conveyor motor under the particular lateral from which barrels are being withdrawn to establish the count-out control circuit for the lower indicating device in the pair of total indicators. Accordingly relay 1RB1, which controls the foot motor 11, is adapted to close contactor 195 to interconnect limit switch LS16 to units relay 1R2 of the lower counting device. By this arrangement switch bars 51 which control the actuation of limit switch LS16 is arranged to send an electrical pulse through line Z to relay 1R2 for each barrel passing over the bars 51 and thereby subtract a digit from the lower total indicator. Passage of each barrel out of the lateral to the shipping dock, or storage area, is visually presented to the dispatching desk operator and he therefore is apprised at all times of the exact condition of a particular order with regard to the number of barrels needed to complete an order being accumulated on a particular lateral.

In the event that barrels cannot be received upon a particular lateral due to the fact that either that lateral is full or that provision cannot be made for handling a particular type of drum due to the temporary inadequacy of the number of laterals, a return circulation loop 12 has been provided to permit the return flow of undispatched barrels back to the point where they may be re-introduced into the conveyor system and thereby dispatched through the normal dispatching system in the same manner as those received from the normal incoming supply line 1. As shown in the dispatching desk, the only difference in operating procedure for re-introducing the barrels is that the control switch 64 be turned from the "main" position to the "re-circulation" position, and the corresponding drive motor 15 energized to urge the recirculated barrels into the escapement mechanism 24 operated by the main drive motor.

It will be apparent from the foregoing detailed description of the operation of the invention that a control system for a conveyor apparatus has been provided that is capable of operation by a single operator for controlling the flow of articles to be segregated so that the operator is continuously apprised of the status of each order being handled. Likewise it will be apparent that a control system has been provided in which the number of articles being dispatched over a segregating conveyor system is automatically registered when such articles are so dispatched.

While in the description of the control system for a conveyor of the class described the synchronous time delay device 8 has been described in terms of "time" delay, it will be apparent from the foregoing description that this mechanism as applied to the present invention is in actuality a space relationship controlling device since delay device 8 is driven synchronously with the pusher bars 23 which move the articles over header 3. In this way the exact distance from the triggering means provided by the light source and photoelectric cell is utilized as the initiating point to each of the laterals and irrespective of the time required for an article to move between the initiating point and the desired lateral the proper space relationship may be maintained. It will therefore be apparent that by virtue of this arrangement a synchronous control system has been provided in which the spaced relationship of the articles being conveyed controls the operation of the dispatching means automatically after the desired selection of lateral has been made by the operator.

While numerous modifications and changes in the conveyor control system disclosed in this specification will be apparent to those skilled in the art, all such modifications and changes as fall within the scope of the appended claims we thereby intend to include.

We claim:

1. A package dispatching system comprising a main conveyor, a single loading station for said conveyor, said conveyor having a closed circuit adapted to recirculate continuously packages not removed therefrom, a plurality of laterals adjacent said main conveyor adapted to receive packages therefrom, each of said laterals being arranged to accumulate packages thereon throughout its length, a unitary package segregating means at said loading station, a totalizing board having a pair of total indicating devices for each of said laterals operable by said segregating means to establish a total number of packages to be routed over a preselected lateral, means synchronized with said main conveyor for tracing the progress of individual package units to the lateral conveyor preselected by said segregating means, means responsive to said package segregating means for operating one of said indicating devices when a package is dispatched to the corresponding lateral, normally-retracted displacement means opposite each of said laterals responsive only to said segregating means and independent of the position of the packages on said main conveyor for directing said individual packages onto said preselected lateral when they approach alignment therewith, means responsive to the position of packages accumulated on said lateral for rendering said displacement means inoperative when said lateral becomes full of packages to permit the rejected packages to recirculate to said loading station, and means responsive to the removal of packages from said lateral for operating the other of said pair of indicating devices for comparison of the number of packages removed from said lateral with the total number of packages dispatched to said lateral and the total established by said segregating means on said totalizing board.

2. An article tallying system comprising a dispatching station adapted to control the dispatching of articles from a common conveyor to a plurality of laterals, means for operating a totalizing board having a pair of total indicating devices for each of said laterals to indicate a pair of totals corresponding to the number of articles to be routed over each of said laterals, means operable by said dispatching station for subtracting from the initial total indicated by one of said pair of devices when an article is dispatched to the corresponding lateral whereby the total articles remaining to be dispatched is continuously indicated and switch means operable by the passage of an article from said lateral for subtracting from the total indicated by the other of said pair of devices to continuously indicate the status of the total articles to be routed over said lateral.

3. An article tallying system comprising a dispatching station adapted to control the segregation of articles from a common conveyor to a plurality of laterals, said station comprising order set-up means for operating a score board to indicate a pair of totals corresponding to the number of articles in a group to be routed over each of the laterals and means for operating said score board to subtract from one of said totals when an article is dispatched by said dispatching station whereby the total number of articles remaining to be dispatched to each lateral is continuously indicated, and means operable by the passage of an article from said lateral for automatically subtracting from the other of said totals on said score board to continuously indicate the status of said group to the operator of said dispatching station.

4. In an automatic conveyor system including a supply conveyor section for supplying packages to a header conveyor section, said header section being adapted to convey packages to be segregated as a group to a plurality of lateral conveyor sections, means for positively moving said packages over said header section in equally spaced intervals, deflector means independent of said last named means and adjacent the header end of said laterals for causing a package to be deflected onto said lateral sections when placed across the path of said package passing along said header section, power means for operating said deflector means, operating means for said power means for predetermining the lateral to which said package is to be segregated from said header, a dispatching station between said supply section and the first of said plurality of laterals for initiating the operation of said operating means for said deflector means and removable stop means at the end of said laterals whereby the packages may be stopped and accumulated along the length of each of said laterals until said stop means are removed, a package tallying system comprising a totalizing board having at least a pair of total indicator devices for each of said laterals for continuously indicating the number of packages to be routed over one of said laterals, total operating means for initially establishing the total number of packages on said pair of devices, switch means associated with said dispatching station adapted to subtract from one of the totals registered by said pair of devices when a package is dispatched to one of said laterals, and switch means operable by the passage of packages from said lateral when said stop means are removed for subtracting from the other of said pair of indicator devices whereby the operator of said dispatching station may be continuously apprised of the status of the total packages to be handled by each of said laterals.

5. In a package conveyor system including a header conveyor constructed and arranged to supply packages to a plurality of lateral conveyors, means for introducing packages to said header in spaced relation, pushing means for moving individual packages over said header in the same said spaced relation, a dispatching station between said means for introducing packages and the first of said plurality of laterals for preselecting the lateral to which each package is to be diverted, interval determining means operable in response to said dispatching station, deflector means adjacent the ends of each of said laterals, power means independent of said pushing means and operable by said interval determining means for moving said deflector means into the path of a package being conveyed over said header prior to the arrival of said package adjacent the end of the lateral preselected by said dispatching station whereby said pushing means causes said package to move against said deflector and onto said preselected lateral, and removable stop means at the lower end of each of said laterals whereby packages may be accumulated along the length of said laterals, a package tallying system comprising a totalizing board having at least a pair of total indicator devices for each of said laterals for continuously indicating the number of packages to be routed over one of said laterals, total operating means for initially establishing the total number of packages on said pair of devices, switch means associated with said dispatching station adapted to subtract from one of the totals registered by said pair of devices when a package is dispatched to one of said laterals, and switch means operable by the passage of packages from said lateral when said stop means are removed for subtracting from the other of said pair of indicator devices whereby the operator of said dispatching station may be continuously apprised of the status of the total packages to be handled by each of said laterals.

6. A remote control operating system for a conveyor apparatus of the type having a main conveyor for the distribution of packages to a plurality of laterals which are adapted to temporarily store packages thereon in order to assemble a predetermined group of said packages, said laterals being adapted to convey said group to an exit conveyor, said system comprising a dispatch station including order set-up switch means for initially registering a pair of totals on a totalizing device corresponding to a particular group of packages to be routed over a preselected lateral and switch means for operating a delay operating device synchronized with the movement of a package from said dispatch station to a position adjacent said preselected lateral and subtracting a digit from one said pair of totals, power deflector means independent of said main conveyor and adjacent the head of each lateral for deflecting said packages onto said lateral and operable by said delay operating device prior to the arrival of a selected package, and switch means operable by the passage of each package of said group from said lateral to said exit conveyor for subtracting a digit from the other of said pairs of totals whereby the operator of said dispatching station is continuously apprised of the number of packages dispatched to a lateral and the total number of packages routed into and out of said preselected lateral.

7. A control system for a conveyor system of the class described comprising a main conveyor, a plurality of lateral conveyors served by said main conveyor and a supply conveyor for supplying articles to said main conveyor, said control system comprising a drive motor for said main conveyor, pusher bar means for moving articles admitted to said main conveyor at predetermined spaced intervals driven by said motor, escapement means operable in synchronism with said motor for admitting articles from said supply conveyor in spaced relationship to said pusher bar means, switch means for selectively dispatching an article to any of said laterals, indexing means operable by said switch means and in response to the position of an article on said main conveyor, timing means for each of said laterals synchronously operated by said drive motor and operable in response to said indexing means, and deflector means operable in response to said timing means for diverting an article to the lateral selected by said dispatching switch means.

8. A control system for a conveyor system of the class described comprising a main conveyor, a plurality of lateral conveyors served by said main conveyor, and a supply conveyor for supplying articles to said main conveyor, said control system comprising a drive motor for said main conveyor, means driven by said motor for moving articles admitted to said main conveyor at predetermined space intervals therealong, escapement means operable in synchronism with said motor for admitting articles from said supply conveyor to said main conveyor in spaced relationship corresponding to said predetermined space intervals on said main conveyor, switch means for selectively dispatching an article from said main conveyor to any of said lateral conveyors, indexing means operable in response to said switch means and in response to the passage of an article at a predetermined position on said main conveyor, timing means for each of said laterals synchronously operated by said drive motor and operable in response to said indexing means, and deflector means operable in response to said timing means for diverting an article to the lateral selected by said dispatching switch means.

References Cited in the file of this patent

UNITED STATES PATENTS

| | | |
|---|---|---|
| 1,825,037 | Anderson | Sept. 29, 1931 |
| 1,868,894 | Glahn | July 26, 1932 |
| 1,881,514 | Keller et al. | Oct. 11, 1932 |
| 1,981,783 | De Bussey | Nov. 20, 1934 |
| 2,216,685 | Caesar | Oct. 1, 1940 |
| 2,217,342 | Ladrach | Oct. 8, 1940 |
| 2,256,327 | Parkes et al. | Sept. 16, 1941 |
| 2,307,712 | Schenk | Jan. 5, 1943 |
| 2,310,461 | Regan et al. | Feb. 9, 1943 |
| 2,346,869 | Poole | Apr. 18, 1944 |
| 2,412,137 | Fink | Dec. 3, 1946 |
| 2,497,149 | Berdis et al. | Feb. 14, 1950 |